(12) United States Patent
Williams et al.

(10) Patent No.: US 8,484,660 B2
(45) Date of Patent: Jul. 9, 2013

(54) EVENT QUEUING AND CONSUMPTION

(75) Inventors: Chad Michael Williams, San Mateo, CA (US); Matt Henry Van der Staay, San Jose, CA (US); Imran Arif Maskatia, Hayward, CA (US)

(73) Assignee: Microsoft Corporation, Redmond, WA (US)

( * ) Notice: Subject to any disclaimer, the term of this patent is extended or adjusted under 35 U.S.C. 154(b) by 1317 days.

(21) Appl. No.: 11/811,999

(22) Filed: Jun. 13, 2007

(65) Prior Publication Data

US 2008/0313651 A1 Dec. 18, 2008

(51) Int. Cl.
| G06F 3/00 | (2006.01) |
| G06F 9/44 | (2006.01) |
| G06F 9/46 | (2006.01) |
| G06F 13/00 | (2006.01) |

(52) U.S. Cl.
USPC ............ 719/318; 719/313; 719/320; 718/100

(58) Field of Classification Search
None
See application file for complete search history.

(56) References Cited

U.S. PATENT DOCUMENTS

| 5,881,315 | A | 3/1999 | Cohen |
| 6,192,029 | B1 * | 2/2001 | Averbuch et al. ............ 370/229 |
| 6,275,232 | B1 | 8/2001 | Cataudella et al. |
| 6,477,585 | B1 | 11/2002 | Cohen et al. |
| 6,728,715 | B1 | 4/2004 | Astley et al. |
| 7,174,557 | B2 | 2/2007 | Sanghvi et al. |
| 7,177,925 | B2 | 2/2007 | Carcido et al. |
| 2005/0289559 | A1 | 12/2005 | Illowsky et al. |
| 2006/0155719 | A1 | 7/2006 | Mihaeli et al. |
| 2006/0248539 | A1 | 11/2006 | Sanghvi et al. |
| 2007/0005757 | A1 | 1/2007 | Finger et al. |
| 2007/0043856 | A1 * | 2/2007 | Morris et al. ................. 709/224 |

OTHER PUBLICATIONS

Cugola, et al., "Exploiting an event-based infrastructure to develop complex distributed systems", Proceedings of the 1998 (20th) International Conference on Software Engineering, Date: Apr. 19-25, 1998, pp. 261-270, http://ieeexplore.ieee.org/search/wrapper.jsp?arnumber=671135.

O'Ryan, et al., "Applying a scalable CORBA event service to large-scale distributed interactive simulations", Proceedings. Fifth International Workshop on Object-Oriented Real-Time Dependable Systems, Date: Nov. 18-20, 1999, pp. 67-74, http://ieeexplore.ieee.org/search/wrapper.jsp?arnumber=842335.

Lemmerman, Dmitri K., et al., "Adapting Event-Based Applications for Synchronization in VR Clusters", *Proceedings of the 8th International Immersive Projection Technology Workshop*, (May 2004),7 pages.

* cited by examiner

*Primary Examiner* — Andy Ho
*Assistant Examiner* — Craig Dorais
(74) *Attorney, Agent, or Firm* — Wolfe-SBMC (57) ABSTRACT

Techniques are described to provide event queuing and consumption. In an implementation, events received at an event router are queued after determining that a switch is to be performed from a first event consumer to a second event consumer. Events previously queued at the first event consumer are communicated to the second event consumer, and when completed, the events queued at the event router are communicated to the second event consumer.

20 Claims, 9 Drawing Sheets

EVENT QUEUING AND CONSUMPTION

BACKGROUND

Events may be encountered in computing environments in a variety of ways. For example, an event may be triggered by a user, such as through a keystroke, by "right clicking" a mouse, and so on. In another example, events may also be triggered by applications, whether executed locally at a client or remotely over a network connection. The events may then be communicated and processed in a variety of ways, such as by being passed from an operating system to an application to cause a file to be opened, saved, and so forth.

In some instances, a variety of different entities may be available at any one time to consume events, by what may be referred to in the following discussion as "event consumers". For example, a first application may be configured to consume content of a particular type while a second application may be configured to consume content of another type. Therefore, techniques were developed to permit switching between these event consumers when desired, such as when switching between types of content consumption. Traditional techniques that were employed to manage how these events are consumed, however, could be inefficient when switching between consumers, thereby reducing the speed and efficiency of devices that employed these traditional techniques. Additionally, these traditional techniques could even encounter errors due to "dropped" (e.g., missed) events, due to processing of out-of-order events, and so on.

SUMMARY

Techniques are described to provide event queuing and consumption. In an implementation, events received at an event router are queued after determining that a switch is to be performed from a first event consumer to a second event consumer. Events previously queued at the first event consumer are communicated to the second event consumer, and when completed, the events queued at the event router are communicated to the second event consumer.

In a further implementation, an event consumption system includes an event router to route events to a plurality of event consumers. The events are serialized in a particular order, one after another, for consumption by a respective one of the event consumers. When a deactivate event is encountered, a switch is to be performed from a first one of the event consumers to a second one of the event consumers by queuing events at the event router until events from a queue of the first event consumer are transferred to the second event consumer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Events form part of the backbone of processing performed in a computing environment. For example, an event may be triggered by a user (e.g., by "right clicking" a mouse), by an application (e.g., by calling an application programming interface), may be communicated remotely over a network connection, and so on. Traditional techniques that were employed to manage events, however, could be inefficient and result in errors, such as by processing events out-of-order, "dropping" events, and so on.

Techniques are described to queue and consume events. In an implementation, an event consumption system includes an event router and a plurality of event consumers. The event router "knows" which event consumers are active and is responsible for communicating events to the appropriate queue of the appropriate event consumer. When a switch is to be made from a current event consumer to a new event consumer, the event router queues the events. Events already queued at the current event consumer are streamed to the new event consumer, after which the events queued at the event router are then streamed to the new event consumer. In this way, serialization of the events is maintained while ensuring that events are not "lost". Further discussion of the event consumption system may be found in relation to the following sections.

In the following discussion, an exemplary environment is first described that is operable to perform event queuing and consumption techniques. Exemplary procedures are then described that may be employed in the exemplary environment, as well as in other environments. Although these techniques are described as employed within a television environment in the following discussion, it should be readily apparent that these techniques may be incorporated within a variety of environments without departing from the spirit and scope thereof.

Exemplary Environment

Figure 1:
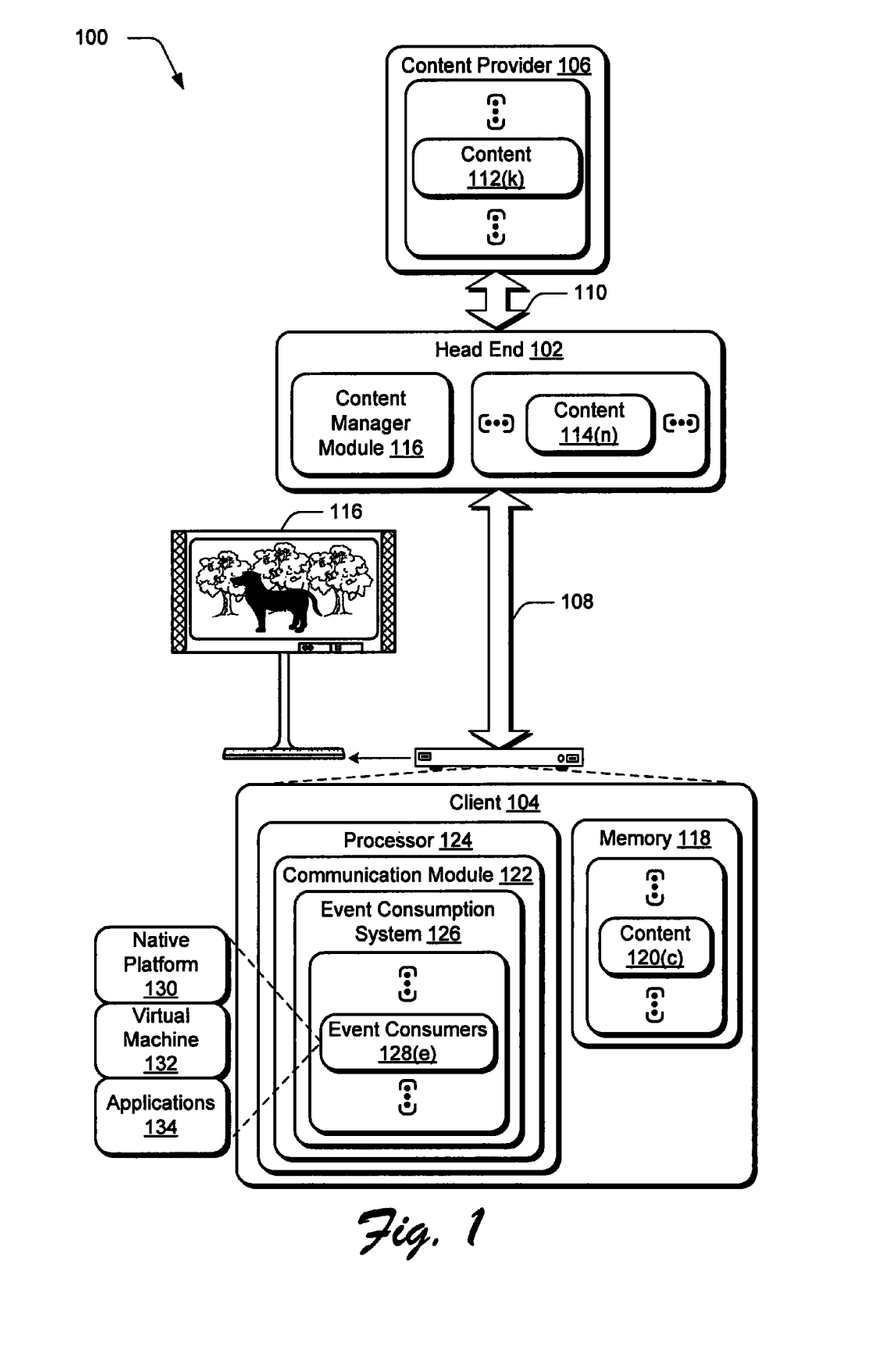
FIG. 1 is an illustration of an environment in an exemplary implementation that is operable to manage event consumption.

FIG. 1 is an illustration of an environment 100 in an exemplary implementation that is operable to queue and consume events. The illustrated environment 100 includes a head end 102 of a network operator, a client 104 and a content provider 106 that are communicatively coupled, one to another, via network connections 108, 110. In the following discussion, the head end 102, the client 104 and the content provider 106 may be representative of one or more entities, and therefore reference may be made to a single entity (e.g., the client 104) or multiple entities (e.g., the clients 104, the plurality of clients 104, and so on). Additionally, although a plurality of network connections 108, 110 are shown separately, the network connections 108, 110 may be representative of network connections achieved using a single network or multiple networks. For example, network connection 108 may be representative of a broadcast network with back channel communication, an Internet Protocol (IP) network, and so on.

The client 104 may be configured in a variety of ways. For example, the client 104 may be configured as a computer that is capable of communicating over the network connection 108, such as a desktop computer, a mobile station, an entertainment appliance, a set-top box communicatively coupled to a display device as illustrated, a wireless phone, and so forth.

The content provider 106 includes one or more items of content 112($k$), where "k" can be any integer from 1 to "K". The content 112($k$) may include a variety of data, such as television programming, video-on-demand (VOD) files, one or more results of remote application processing, and so on. The content 112($k$) is communicated over the network connection 110 to the head end 102.

Content 112($k$) communicated via the network connection 110 is received by the head end 102 and may be stored as one or more items of content 114($n$), where "n" can be any integer from "1" to "N". The content 114($n$) may be the same as or different from the content 112($k$) received from the content provider 106. Distribution from the head end 102 to the client 104 may be accommodated in a number of ways, including cable, radio frequency (RF), microwave, digital subscriber line (DSL), and satellite.

The client 104, as previously stated, may be configured in a variety of ways to receive the content 114($n$) over the network connection 108. The client 104 typically includes hardware and software to transport and decrypt content 114($n$) received from the head end 102 for rendering by the illustrated display device. Although a display device is shown, a variety of other output devices are also contemplated, such as speakers.

The client 104, for instance, may include digital video recorder (DVR) functionality. For example, the client 104 may include a memory 118 to record content 114($n$) as content 120($c$) (where "c" can be any integer from one to "C") received via the network connection 108 for output to and rendering by the display device. Thus, content 120($c$) that is stored in the memory 118 of the client 104 may be copies of the content 114($n$) that was streamed from the head end 102. Additionally, content 120($c$) may be obtained from a variety of other sources, such as from a computer-readable medium that is accessed by the client 104, and so on.

The client 104 as illustrated includes a communication module 122 that is executable on a processor 124 and is storable in the memory 118 of the client 104 to control content playback on the client 104, such as through the use of one or more "command modes", i.e., "trick modes". The command modes may provide non-linear playback of the content 120($c$) (i.e., time shift the playback of the content 120($c$)) such as pause, rewind, fast forward, slow motion playback, and the like. The processor 124 is not limited by the materials from which it is formed or the processing mechanisms employed therein. For example, processors may be comprised of semiconductor(s) and/or transistors (e.g., electronic integrated circuits (ICs)). In such a context, executable instructions may be electronically-executable instructions that are performed by the processor 124. Additionally, although a single memory 118 is shown, a wide variety of types and combinations of memory may be employed, such as random access memory (RAM), hard disk memory, removable medium memory, and other types of computer-readable media.

The content 114($n$) may also be representative of time-shifted content, such as video-on-demand (VOD) content that is streamed to the client 104 when requested, such as movies, sporting events, and so on. For example, the head end 102 may execute a content manager module 116 to provide a VOD system such that the content provider 106 supplies content 112($k$) in the form of complete content files to the head end 102. The head end 102 may then store the content 112($k$) as content 114($n$). The client 104 may then request playback of desired content 114($n$) by contacting the head end 102 (e.g., a VOD server) and requesting a feed of the desired content. The content manager module 116 may also be representative of functionality to configure content 112($k$) received from the content provider 106 to be suitable for transmission over the network connection 108, such as to "packetize" the content for distribution over the Internet, configuration for a particular broadcast channel, map the content 112($k$) to particular channels, and so on.

In another example, the content 114($n$) may further be representative of content (e.g., content 112($k$)) that was recorded by the head end 102 in response to a request from the client 104, in what may be referred to as a network DVR example. Like VOD, the recorded content 114($n$) may then be streamed to the client 104 when requested. Interaction with the content 114($n$) by the client 104 may be similar to interaction that may be performed when the content 120($c$) is stored locally in the memory 118.

Thus, in the environment 100 of FIG. 1, the client 104 may consume content from a variety of sources. For instance, the content provider 106 may broadcast the content 112($k$) over a network connection 110 to a multiplicity of network operators, an example of which is illustrated as head end 102. The head end 102 may then stream the content 114($n$) over a network connection to a multitude of clients, an example of which is illustrated as client 104. The client 104 may then store the content 114($n$) in the memory 118 as content 120($c$) and/or render the content 114($n$) immediately for output as it is received, such as when the client 104 is configured to include digital video recorder (DVR) functionality. The client 104 may also be configured to consume content 114($n$) when configured as VOD, pay-per-view content, music, images, and so on. Thus, the client 104 may consume a wide range of content.

To consume this content from this variety of content, the communication module 122 is illustrated as including an event consumption system 126 to manage consumption of a plurality of event consumers 128($e$) (where "e" can be any integer from one to "E"). For example, the event consumers 128($e$) may be configured in a variety of ways, such as a native platform 130, a virtual machine 132, applications 134, and so on. The event consumption system 126 may therefore be used to provide events to these different event consumers 128(e) to maintain serialization and reduce "lost" events, further discussion of which may be found in relation to the following figure.

Figure 2:
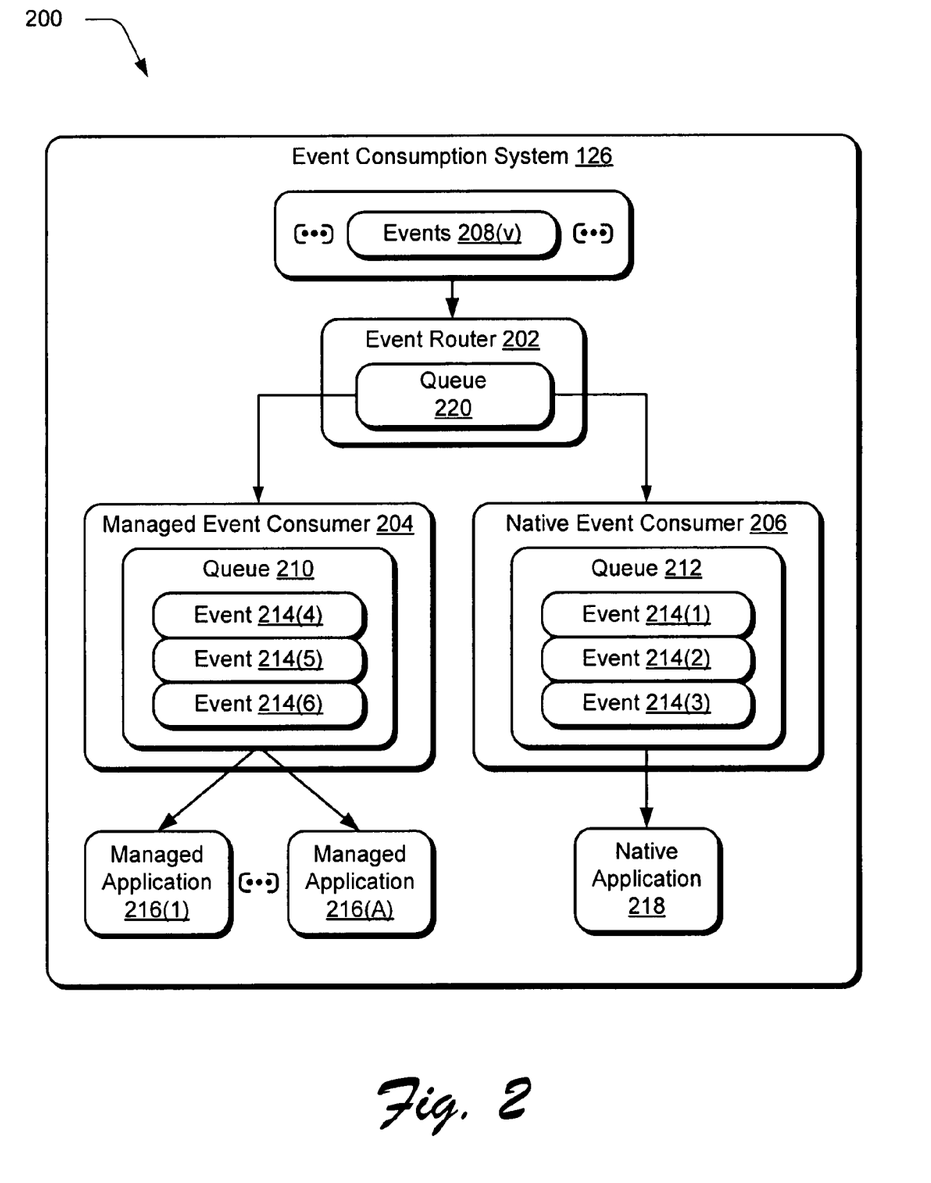
FIG. 2 depicts an exemplary embodiment showing an event consumption system of FIG. 1 in greater detail.

FIG. 2 depicts an exemplary embodiment 200 showing the event consumption system 126 of FIG. 1 in greater detail. The event consumption system 126 includes an event router 202 and a plurality of event consumers which are illustrated as a managed event consumer 204 and a native event consumer 206 in FIG. 2, although there can be a wide variety of other event consumers. The event consumption system 126, for instance, may employ multiple mechanisms that consume events 208(v) (where "v" can be any integer from one to "V"), especially those that have support for virtual machines. Each mechanism (e.g., the managed event consumer 204 and/or the native event consumer 206) tends to have a separate event queue that processes events in order, which is illustrated as queues 210, 212 for the managed event consumer 204 and the native event consumer 206, respectively.

In any such system, events may be encountered that are serialized and ordered for consumption in the same order in which the events were generated. This is illustrated in FIG. 2 as included events 214(1), 214(2) and 214(3) in the queue 212 of the native event consumer 206 and events 214(4), 214(5) and 214(6) in the queue 210 of the managed event consumer 204. Even though the event 214(1)-214(6) are serialized, as illustrated in FIG. 2 these events 214(1)-214(6) may be consumed by different respective event consumers. In the illustrated implementation, each of the events 214(1)-214(6) is configured for consumption by a single entity and not multiple entities at the same time. For example, an event may be consumed by the managed event consumer 204 or the native event consumer 206, but not both.

A variety of different situations may be encountered to cause a switch from one event consumer to another event consumer. For example, the events themselves can cause a switch from one consumer to another, an "outside entity" (e.g., an application) may cause a switch, and so on. When switching between event consumers, the event consumption system 126 may employ techniques to determine which mechanism will consume particular queued events, when to switch between event consumers, and when to propagate the queued events from a current consumer to a new consumer, while retaining the original order in which the events were generated.

For example, as shown in FIG. 1 the event consumption system 126 may be employed within a television environment to consume different types of content. In such a system the native event consumer 206 may be configured to consume traditional broadcast content, while the managed event consumer 204 may be configured to control consumption of other types of content, such as video on demand. For instance, the native event consumer 206 may support native code written in C and C++. In addition, the managed event consumer 204 may have a virtual machine that supports managed code written in C#. Both the native event consumer 206 and the managed event consumer 204 consume events and keep their own separate event queues 212, 210, respectively.

In this example, managed applications 216(1)-216(A) that receive events generally do not handle tuning to particular channels. Instead, the events are handled by the native event consumer 206. For instance, if a user is running a managed application 216(1) to consume video on demand and then presses the '2', '0', and '1' keys of a remote control to tune to channel 201, the managed application 216(1) sees the '2' key and decides that it is not capable of handing this input at this time. Therefore, these three key events are sent to the queue 212 of the native event consumer 206 after they have already been placed in the queue 210 of the managed event consumer 204.

Further, channel tuning in this example implies a switch from the managed application 216(1) of the managed event consumer 204 to a native application 218 of the native event consumer 206 that provides channel tuning, and thus any additional events generated are also sent to the native queue. Further, these events are to be inserted after the '2', '0', and '1' keys. If this is not done properly, the keys may be processed by the native event consumer 206 out of order, resulting in a tune to a different channel. For instance, if the switch from the managed event consumer 204 to the native event consumer 206 happens between the '0' and the '1' keys, the client 104 may tune to channel 210 instead.

Accordingly, the event consumption system 126 employs the event router 202 that "knows" which of the event consumers are active and sends events to the appropriate queue, e.g., queues 210, 212. For instance, when the managed applications 216(1)-216(A) are launched, the event router 202 is told to send events 208(v) to the queue 210 of the managed event consumer 204 and the managed applications 216(1)-216(A) consumes those events. When either of the managed applications 216(1)-216(A) reaches an event that it is not capable of handling, it sends the event to the queue 212 of the native event consumer 206 via an application programming interface (API). If this event results in a switch from the managed event consumer 204 to the native event consumer 206, then the event router 202 is told to stop sending events to the managed event consumer 204 and to store subsequent events for future use by the native event consumer 206 in a queue 220.

At this point, the event consumption system 126 is informed that the managed applications 216(1)-216(A) are to be deactivated and it should communicate events that remain in the queue 210 (e.g., events 214(4)-214(6)) to the native event consumer 206. Then, a special "Reset" event is injected into the managed event queue 210 signifying the end of the event stream. The managed application(s) 216(1)-216(A) may then service the events 214(4)-214(6) in the queue 210 of the managed event consumer 204 by sending them to the queue 212 of the native event consumer 206 using the API. Once the events 214(4)-214(6) are communicated, the managed event consumer 204 informs the event router 202 to communicate events that have been stored in the queue 220 to the native event consumer 206 in the order that they were generated.

Thus, the event consumption system 126 may enforce serialization of events and ensure that events are not dropped or handled out of order during context switches. Traditional techniques used to provide a switch between event consumers prevented events from being generated during a context switch. However, the techniques described herein may provide significantly better performance than such traditional techniques because events may be continually generated and queued during a switch with little impact on end-user performance, thus being transparent to the user. Further discussion of switching between event consumers may be found in relation to the following procedures.

It should be noted that one or more of the entities shown in FIGS. 1 and 2 may be further divided (e.g., the head end 102 may be implemented by a plurality of servers in a distributed computing system), combined, and so on and thus the environment 100 of FIG. 1 and the embodiment 200 of the event consumption system 126 of FIG. 2 is illustrative of one of a plurality of different environments and systems that may employ the described techniques.

Generally, any of the functions described herein can be implemented using software, firmware, hardware (e.g., fixed-logic circuitry), manual processing, or a combination of these implementations. The terms "module", "functionality" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the event techniques are platform-independent, meaning that the techniques may be implemented on a variety of commercial computing platforms having a variety of processors.

Exemplary Procedures

The following discussion describes event techniques that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 the event consumption system 126 of FIG. 2 and the embodiments 400-900 of the event consumption system 126 of FIGS. 4-9.

Figure 3:
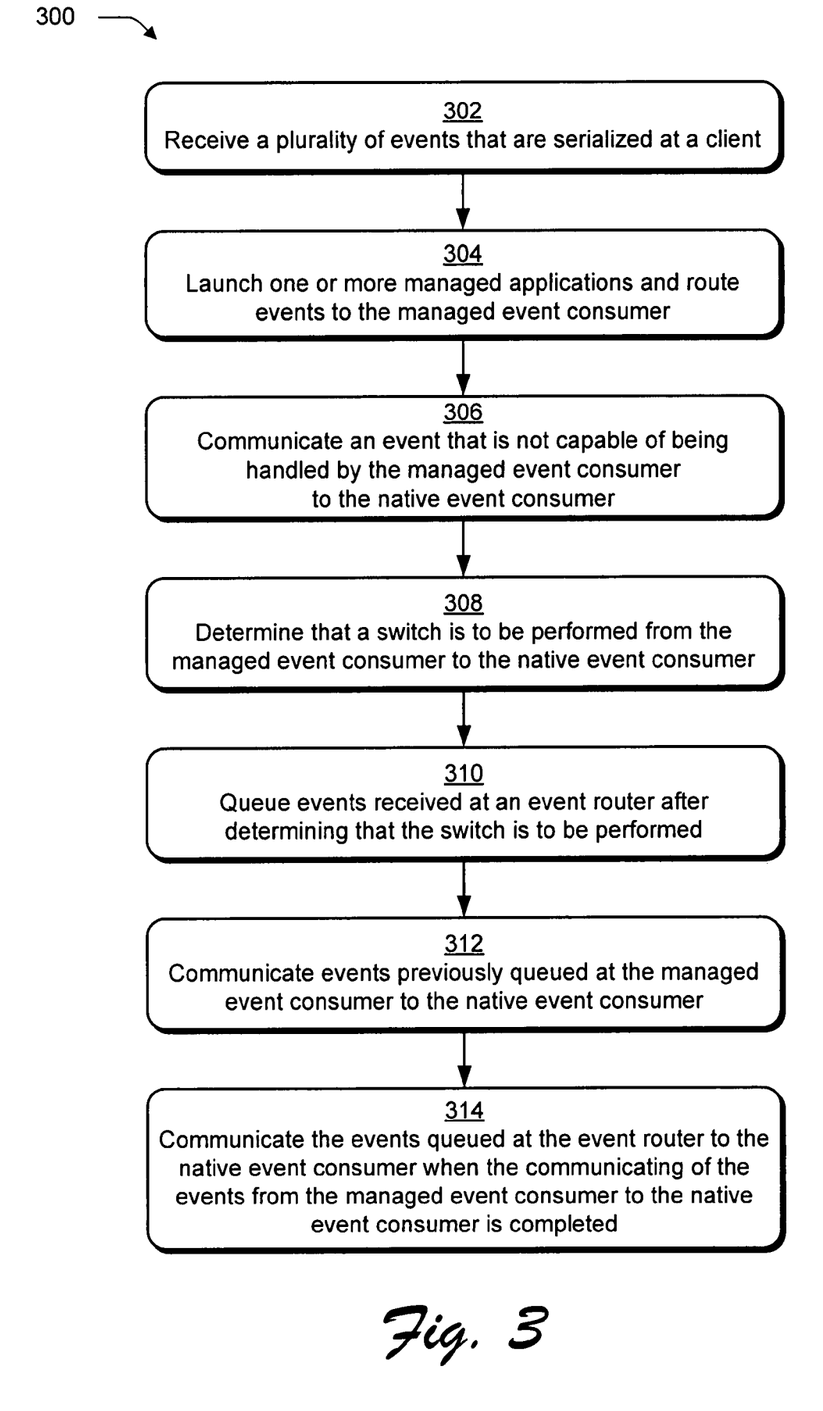
FIG. 3 is a flow diagram depicting a procedure in an exemplary implementation in which events are queued and communicated to retain serialization of the events between event consumers during a switch.

FIG. 3 depicts a procedure 300 in an exemplary implementation in which events are queued and communicated to retain serialization of the events between event consumers during a switch. A plurality of events that are serialized are received at a client (block 302). The events, for instance, may be generated in a particular order that is to be maintained to ensure that the events "make sense," an example of which was previously described regarding a channel change in relation to FIG. 2.

Figure 4:
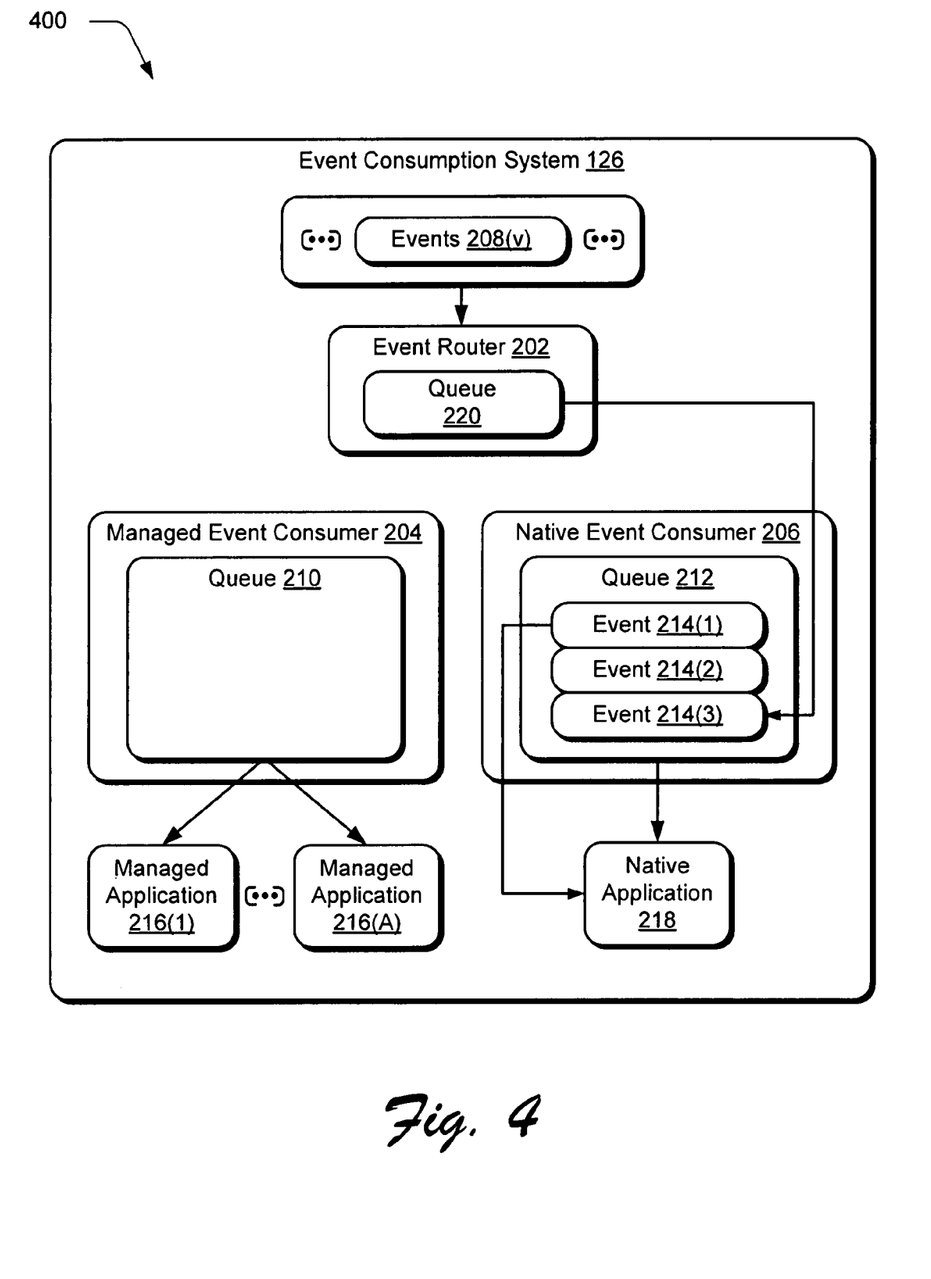
FIG. 4 depicts an exemplary embodiment showing the event consumption system of FIG. 2 as receiving serialized events and providing those events to a native event consumer.

FIG. 4, for instance, depicts an exemplary embodiment 400 showing the event consumption system 126 of FIG. 2 as receiving serialized events and providing those events to the native event consumer 206. The events 214(1)-214(3) are received and ordered as indicated by the respective parenthetical for each reference number. Accordingly, event 214(1) is first received by the queue 212 and provided to the native application 218, while event 214(3) is received most recently and therefore placed at the "end" of the queue 212 after event 214(2). Thus, event 214(1) is illustrated as being "taken from the beginning" of the queue 212 while event 214(3) is "added to the end" of the 212.

Figure 5:
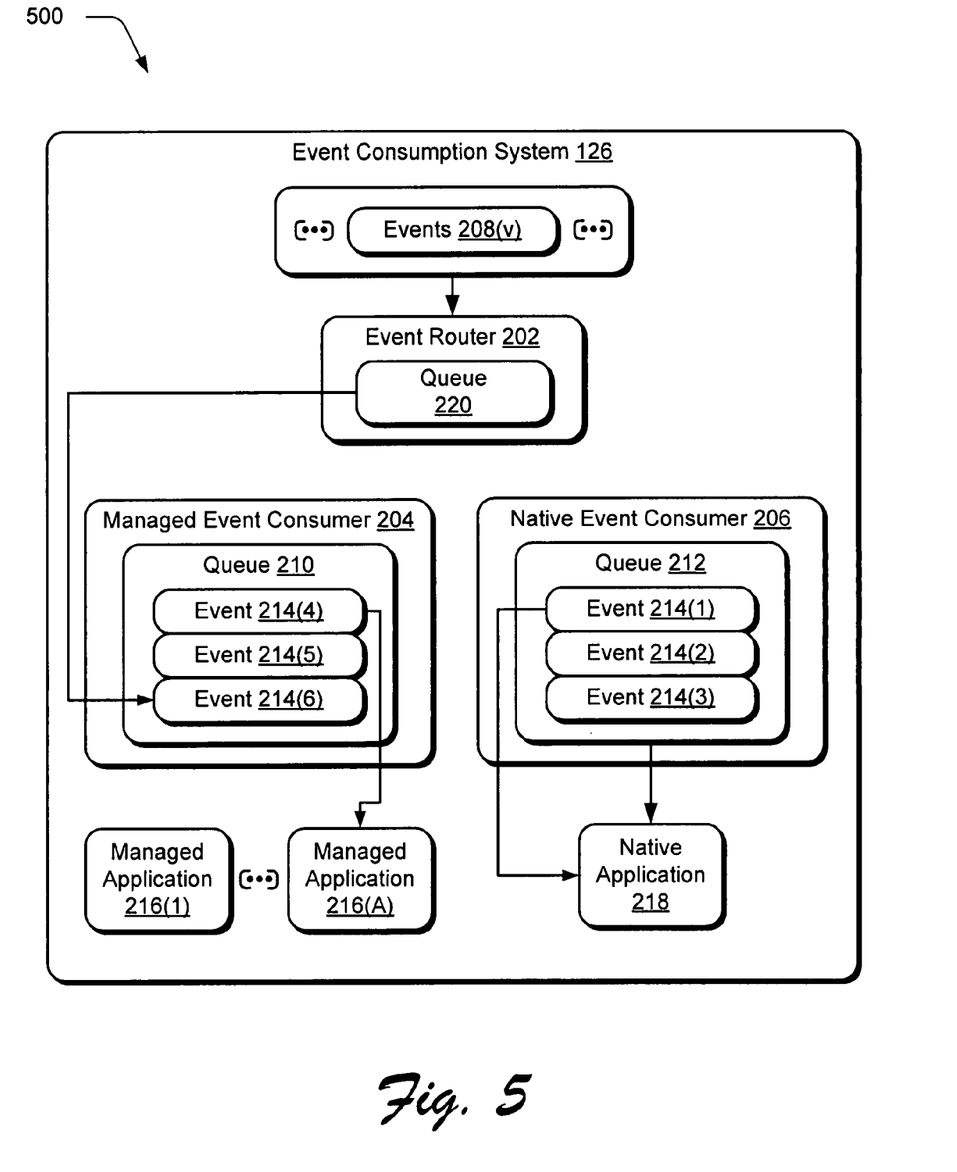
FIG. 5 depicts an exemplary embodiment showing the event consumption system of FIG. 4 as providing events to a managed event consumer when one or more managed applications are launched

One or more managed applications are launched and events are routed to a managed event consumer (block 304) that manages the managed applications, an example of which is depicted in FIG. 5. As shown in the embodiment 500 of FIG. 5, events 214(4)-214(6) are provided to a queue 210 of the managed event consumer 204 by the event router 202 which were generated after the events 214(1)-214(3) in the queue 212 of the native event consumer 206. Like before, events 214(4)-214(6) are also serialized and placed in the queue 210 such that event 214(4) is consumed by managed application 216(A) while event 214(6) is added "after" event 214(5) in the queue 210. Thus, queue 210 may also maintain a serialized order like queue 212. As depicted in FIG. 5, the native application 218 may continue to consume events 214(1)-214(3) from the queue 212 while the managed event consumer 204 receives events 214(4)-214(6), thus avoiding the delay encountered using traditional event management techniques.

Figure 6:
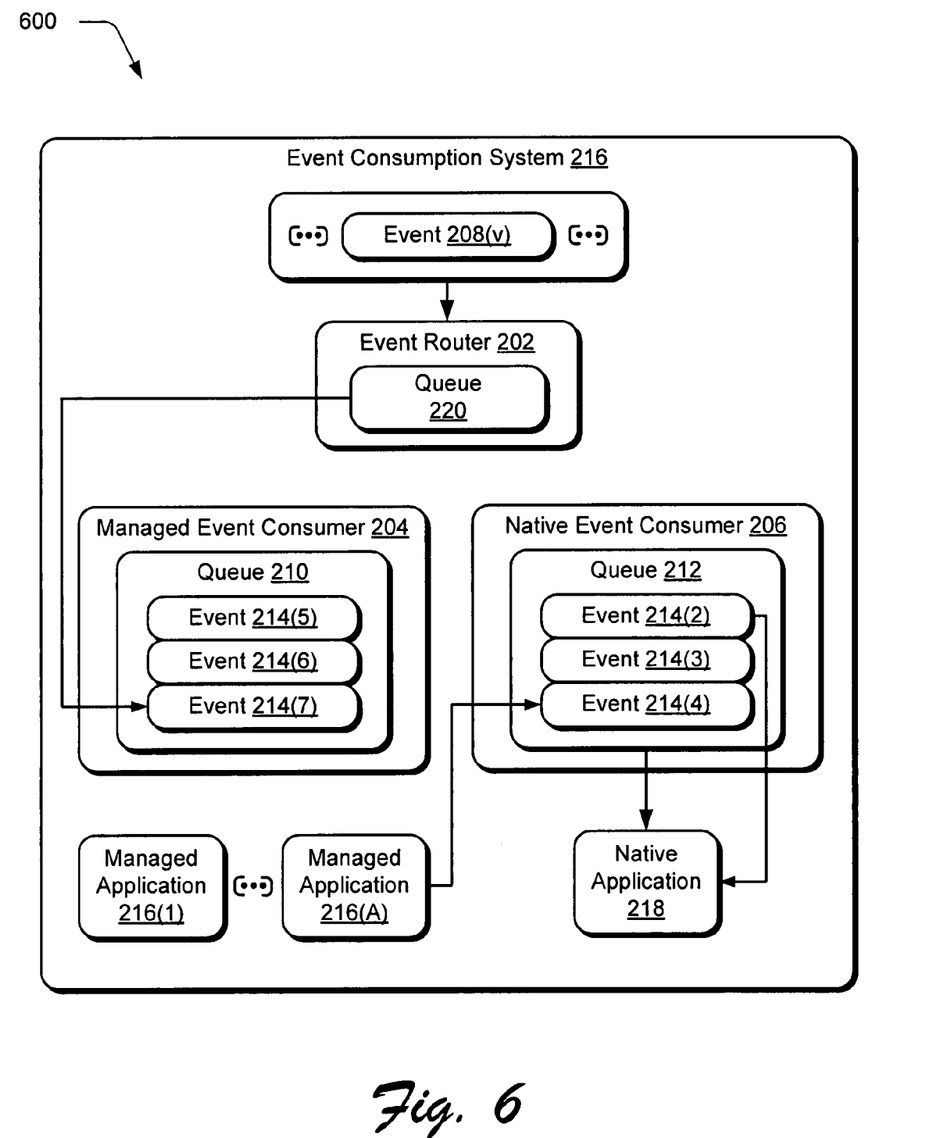
FIG. 6 depicts an exemplary embodiment showing the event consumption system of FIG. 5 as communicating an event from a managed event consumer that is not capable of being handed by the managed event consumer to a native event consumer.

An event that is not capable of being handled by the managed event consumer is communicated to the native event consumer (block 306). For example, FIG. 6 depicts an exemplary embodiment 600 showing the event consumption system 126 of FIG. 5 as communicating an event from a managed event consumer 204 (and more particularly the managed application 216(A)) to the native event consumer 206. The managed application 216(A), for instance, may receive an event that is identified as likely to be processed by the native event consumer 206, such as a "channel change" event in the example of FIG. 2. Therefore, in this example, the managed application 216(A) communicated event 214(4) to the queue 212 of the native event consumer 206 without communicating it through the event router 202. As before, the native application 218 may still continue consuming events from the queue 212. Likewise, the queue 210 of the managed event consumer 204 may continue to receive the event 214(7) from the event router 202. Thus, the event consumption system 216 may continue to process events even when events are communicated between event consumers.

A determination is made that a switch is to be performed from the managed event consumer to the native event consumer (block 308). For example, the communication of the event 214(4) from the managed application 216(A) to the native event consumer 206 may indicate that the switch is to be made as subsequent events (e.g., events 214(5)-214(7)) are likely to also be incapable of being performed by the managed application 216(A). A variety of other examples are also contemplated, such as an out-of-band indication from an outside source (e.g., an application executing "outside" of the event consumption system) as further described in relation to FIG. 8.

Figure 7:
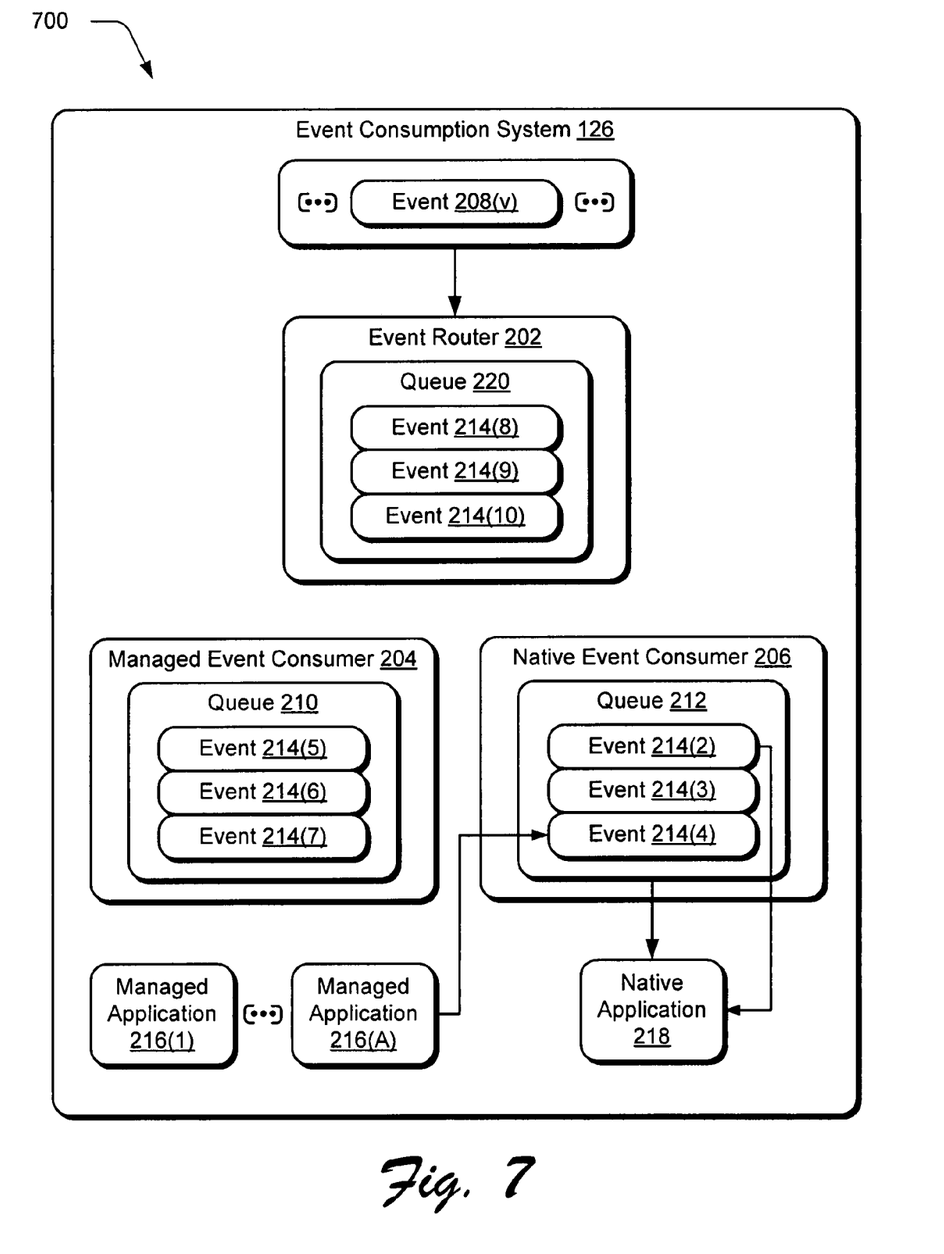
FIG. 7 depicts an exemplary embodiment showing the event consumption system of FIG. 6 as queuing events during a switch from the managed event consumer to the native event consumer.

In response to this indication to switch, events received at the event router are queued after determining that the switch is to be performed (block 310). For example, FIG. 7 depicts an exemplary embodiment 700 showing the event consumption system 126 of FIG. 6 as queuing events 214(8)-214(10) during a switch from the managed event consumer 204 to the native event consumer 206. As before, the native application 218 may continue to consume events from the queue 212 of the native event consumer 206.

Events that were previously queued at the managed event consumer are communicated to the native event consumer (block 312). For example, as shown in the exemplary implementation 800 of FIG. 8, the managed event consumer 204 may receive a deactivate event 802, which may be obtained from a variety of sources, such as "outside" sources as previously described, from the managed application 216(A) in response to the event 214(4) that was not capable of being processed by the managed application 216(A), from the native event consumer 206 in response to reception of the event 214(4) from the managed application 216(A), and so on. In this example, the deactivate event 802 may also be used by the event router 202 as an indication of when to begin storing the events 214(8)-214(10) in the queue 220. A variety of other examples are also contemplated.

Figure 8:
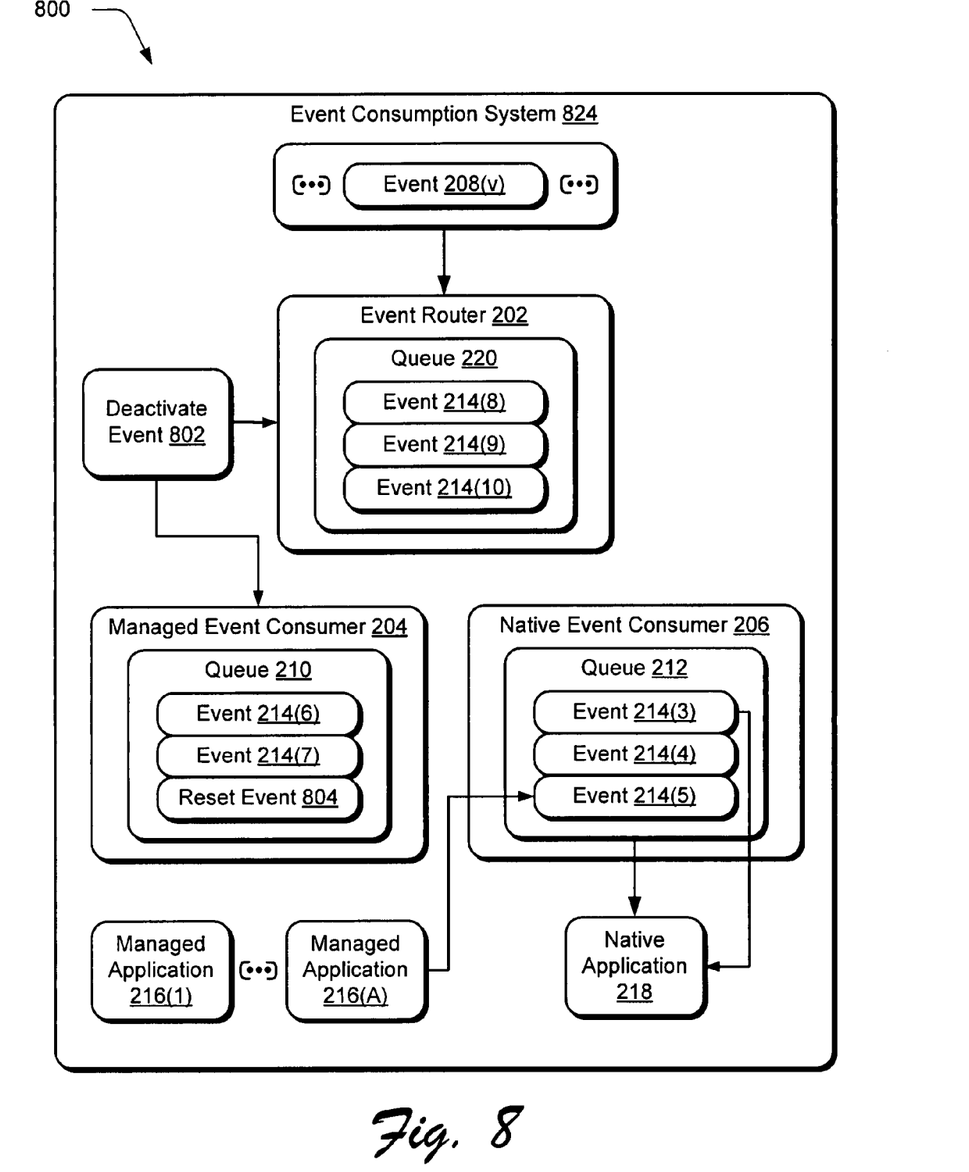
FIG. 8 depicts an exemplary embodiment showing the event consumption system of FIG. 7 as receiving a deactivate event and in response queuing events at an event router while streaming events from the managed event consumer to the native event consumer.

In response to the deactivate event 802 in this example, the managed event consumer places a "Reset" event 804 "at the end" of the queue 210 to indicate an end to the events 214(6)-214(7) stored in the queue 210 of the managed event consumer 204.

Events 214(6)-214(7) that were previously queued at the managed event consumer 204 are sent to the native event consumer 206 (block 312), in order to maintain the serialization. In this way, the events 214(6)-214(7) may be provided in the correct order "after" events 214(3)-214(5) in the queue 212 of the native event consumer 206. In the illustrated embodiment 800 of FIG. 8, the native application 218 continues to consume events, thereby reducing and even eliminating downtime that was encountered using traditional techniques.

Figure 9:
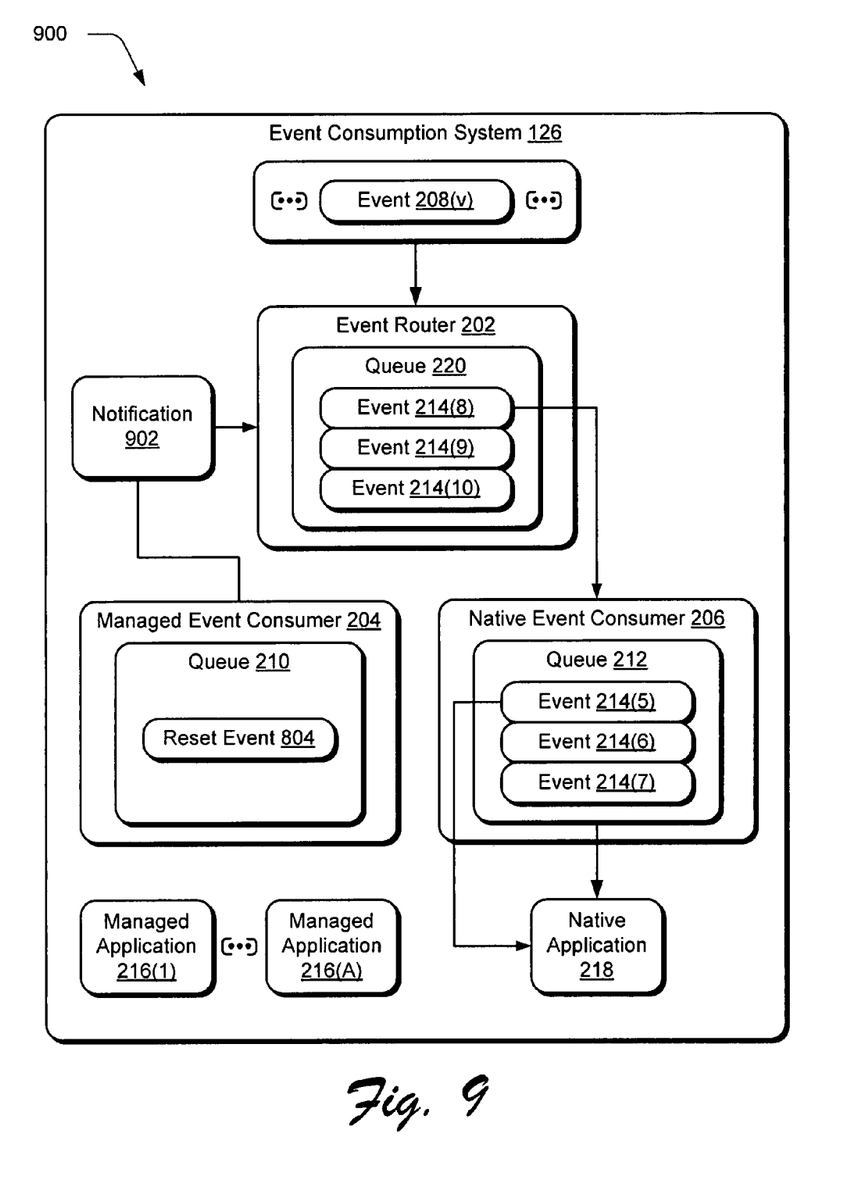
FIG. 9 depicts an exemplary embodiment showing the event consumption system of FIG. 8 as sending a notification to the event router to indicate that the events have been communicated from the managed event consumer to the native event consumer and therefore to begin streaming events from the event router to the native event consumer.

Events queued at the event router are communicated to the native event consumer when the communicating of the events from the managed event consumer to the native event consumer is completed (block 314). Continuing with the previous example, FIG. 9 depicts an exemplary embodiment 900 showing the event consumption system 126 of FIG. 2. The managed event consumer 204 and/or the managed application 216(A) may encounter the "Reset" event 804 after communicating events 214(6)-214(7) to the queue 212 of the native event consumer 206. In response to encountering this event, the managed event consumer 204 may send a notification 902 to the event router 202 to begin streaming events 214(8)-214(10) from the queue 220 to the native event consumer 206. The event router 202 like the managed event consumer 204 may then stream the events 214(8)-214(10) to maintain serialization such that the native event consumer 206 receives and correctly places these events "after" the events 214(6)-214(7) received from the managed event consumer 204 in the queue 212. Thus, serialization of the events 214(1)-214(10) received by the event consumption system 126 in FIGS. 3-9 may be maintained. A variety of other examples are also contemplated without departing from the spirit and scope thereof.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented by a computing device, the method comprising:
   determining that a switch is to be performed from a first event consumer to a second event consumer based on an indication that an event has been sent to the second event consumer from a managed application that is configured to process events queued at the first event consumer and send the event to the second event consumer without communicating the event to an event router;
   receiving an indication to stop sending events from the event router to the first event consumer and to queue subsequently received events for future use by the second event consumer;
   queuing events subsequently received at the event router after determining that the switch is to be performed from the first event consumer to the second event consumer;
   communicating events previously queued at the first event consumer to the second event consumer; and
   when the communicating of the events from the first event consumer to the second event consumer is completed, receiving a notification from the first event consumer to begin communicating the events queued at the event router to the second event consumer, at least some communicated events being consumed by the second event consumer.

2. A method as described in claim 1, wherein said events that are communicated to the second event consumer are serialized such that each of the events is to be consumed in an original order, one after another.

3. A method as described in claim 1, wherein the events received at the event router and the events previously queued at the first event consumer are configured to be consumed by either the first or the second event consumer, but not both.

4. A method as described in claim 1, wherein the communicating of the events previously queued at the first event consumer to the second event consumer is performed without communicating the events previously queued at the first event consumer through the event router.

5. A method as described in claim 1, wherein the communicating of the events queued at the event router to the second event consumer is performed by the event router in response to a notification received by the event router from the first event consumer.

6. A method as described in claim 5, wherein the notification is formed by the first event consumer.

7. A method as described in claim 5, wherein:
   the notification is sent when a reset event is consumed by the first event consumer from the queue of the first event consumer; and
   the reset event is placed in the queue of the first event consumer in response to a deactivate event received by the first event consumer.

8. A method as described in claim 7, wherein:
   the event router also receives the deactivate event; and
   the deactivate event causes the event router to perform the queuing of events.

9. A method as described in claim 1, wherein the first event consumer and the second event consumer are configurable as a virtual machine, a runtime or an application.

10. A method as described in claim 1, wherein the first event consumer is configured as a virtual machine and the second event consumer is configured as a native platform.

11. A method as described in claim 1, wherein at least one of the events received at the event router or one of the events previously queued at the first event consumer is originated locally by a client that employs the first event consumer, the second event consumer and the event router.

12. A method as described in claim 1, wherein at least one of the events received at the event router is originated remotely over a network connection and subsequently received by a client that employs the first event consumer, the second event consumer and the event router.

13. A method as described in claim 1, further comprising communicating a particular said previously queued event from the first event consumer to the second event consumer when it is determined that the particular said previously queued event is not capable of being processed by the first event consumer.

14. One or more computer-readable storage media devices comprising instructions that are executable to provide an application programming interface to cause events to be communicated from:
   a queue of an event consumer to another event consumer based on an indication that an event has been communicated to the other event consumer from a managed application that is configured to:
      process events from the queue of the event consumer, at least some of the events from the queue of the event consumer being consumable by the event consumer;
      transmit a notification to an event router to stop sending the events to the event consumer and to begin storing subsequent events for future use by the other event consumer; and
      send the event to the other event consumer without communicating the event to the event router; and
   the event router to the other event consumer when a reset event is encountered by the event consumer, the event consumer being configured to send, in response to the event consumer encountering the reset event, a notification to the event router to begin streaming the stored subsequent events from the event router to the other event consumer, at least some of the streamed events being consumed by the other event consumer.

15. One or more computer-readable storage media devices as described in claim 14, wherein the reset event is placed within the queue by the event consumer when a deactivate event is received by the event consumer.

16. One or more computer-readable storage media devices as described in claim 15, wherein the deactivate event also causes the event router to queue the events.

17. One or more computer-readable storage media devices as described in claim 14, wherein the events are communicated to remain serialized such that each of the events is maintained in an original order, one after another.

18. One or more computer-readable storage media devices as described in claim 14, wherein the events are configured to be performed by either the event consumer or the other event consumer, but not both.

19. An event consumption system comprising:
   at least a memory and a processor configured to utilize instructions in the memory to implement an event router to route events to a plurality of event consumers, wherein:
      the events are serialized in a particular order, one after another, for consumption by a respective one of said plurality of event consumers;
      a deactivate event is received based on an indication that an event has been communicated from a managed application configured to process queued events in a queue of a first event consumer to a second event consumer without communicating the event through the event router;
      when the deactivate event is encountered, a switch is to be performed from the first event consumer to the second event consumer by ceasing to send events from the event router to the first event consumer and queuing events subsequently received at the event router until queued events from the queue of the first event consumer are transferred to the second event consumer, at least some transferred events being consumed by a consumer via the second event consumer; and
      a notification is received from the first event consumer to indicate an end to the queued events in the queue of the first event consumer and to cause the event router to begin transferring the queued events subsequently received at the event router to the second event consumer.

20. An event consumption system as described in claim 19, wherein after the queued events are transferred from the queue of the first event consumer to the second event consumer, the events queued at the event router are transferred to the second event consumer.

* * * * *